Nov. 3, 1959    H. L. BROUSE    2,911,636
ANGULAR POSITION INDICATING SYSTEM
Filed Dec. 3, 1957
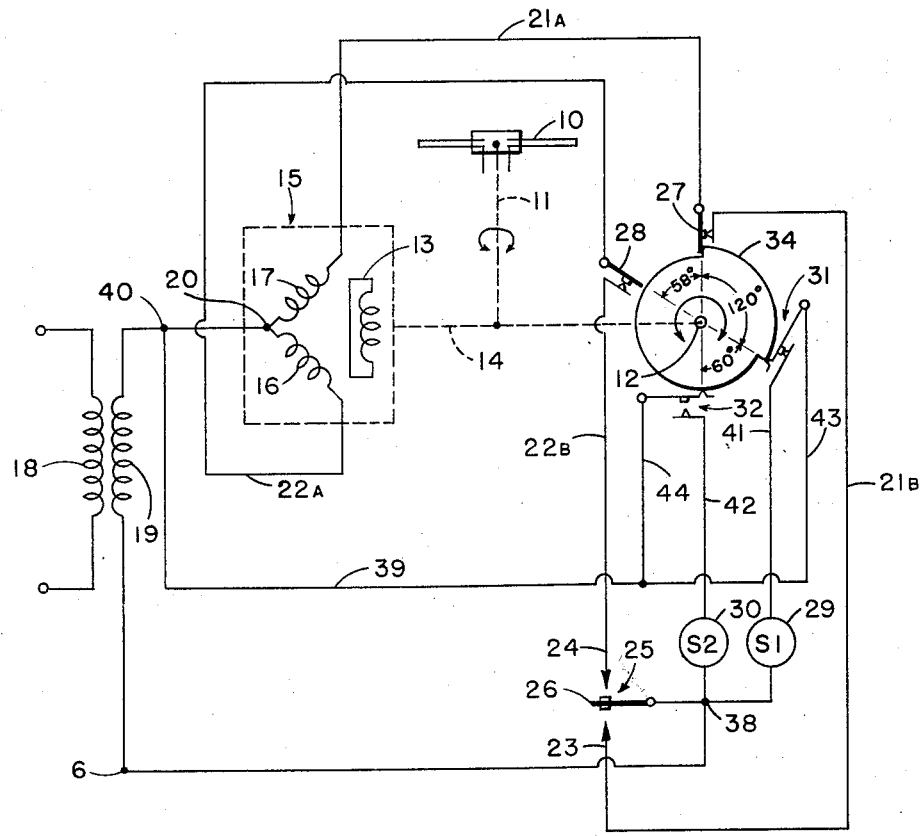
INVENTOR.
HAROLD LEROY BROUSE
BY Alden H. Redfield
Charles M. Hogan.
ATTORNEYS.

United States Patent Office 2,911,636
Patented Nov. 3, 1959

2,911,636

ANGULAR POSITION INDICATING SYSTEM

Harold Leroy Brouse, Cincinnati, Ohio, assignor to Avco Manufacturing Corporation, Cincinnati, Ohio, a corporation of Delaware Application December 3, 1957, Serial No. 700,435

1 Claim. (Cl. 340—271)

The present invention relates to antenna angular position indicators and, although not limited thereto, is of particular utility in furnishing a remote indication of the orientation of a directional antenna of the type characterized by a 180° ambiguity. Gross indications are satisfactory for many usages, such as home television receiver applications.

Conventional methods for rotating an antenna include selsyn motors or potentiometer devices in conjunction with direct-current indicating meters which function in such a way as to indicate the sector in which an antenna is oriented or its precise angular position.

It is an object of the present invention to provide improved apparatus for indicating the approximate position of a rotatable antenna, while achieving simplification which dispenses with the use of selsyn motors, potentiometer devices, indicating meters, and synchro systems generally. While the illustrative embodiment of the invention herein shown is applied to antenna positioning, it is within the teachings of the present invention to utilize it in any application where a remote indication of approximate angular position of a rotating member is desired.

For a better understanding of the present invention, together with other and further objects, capabilities, and advantages thereof, reference is made to the following description of the accompanying drawing, the single figure of which illustrates a preferred embodiment of the invention in schematic form.

Referring now to the drawing, there is shown a dipole 10 positioned on a rotatable mast 11, symbolically indicated by the dashed line 11, secured to and mounted for rotation in synchronism with a vertically positioned motor shaft 12. The shaft is driven and positioned in orientation by a rotor 13 to which the shaft is conventionally secured as indicated symbolically by the dashed line 14. The stator is included in a suitable reversible motor 15 which has the usual windings 16 and 17. In order to establish directional control, the stator windings 16 and 17 are individually connected in circuit, as by lines 22A—22B and 21A—21B, with the two fixed contacts 24 and 23 of a single pole, double throw switch 25, the moving contact 26 of which is directly connected to terminal 6 of the power supply secondary 19. Junction 20 of windings 16, 17 is directly connected to the other terminal 40 of secondary 19. Switch 25 is a reversing switch which is either mechanically or manually so actuated that when the moving contact is closed on contact 24, stator winding 16 is energized to run the motor in the clockwise direction. When, on the other hand, control switch 25 is closed on contact 23, stator winding 17 is energized to run the motor in the counter-clockwise direction. The motor stops when switch 25 is opened.

Limit switches 27 and 28 are provided for the purpose of limiting counter-clockwise and clockwise rotations of the motor shaft, respectively; that is to say, when the motor shaft closely approaches its extreme counter-clockwise limited position, switch 27 is opened to open-circuit and de-energize the counter-clockwise stator winding 17 to prevent rotation of the shaft. Similarly, switch 28 is opened to de-energize the clockwise winding 16 and define the limit of clockwise rotation of the shaft.

In accordance with the invention, the position of the motor shaft is indicated in a gross or approximate manner—and a remote indication is furnished—by the provision of a novel combination inclusive of the above-described means, signal units such, for example, as lamps 29 and 30, cam-actuated signal switches 31 and 32, and a 120° switch cam indicated at 34.

As indicated, signal means such as indicator lamps 29 and 30 are provided at the remote station at which the indication is furnished. These lamps are energized by the energy source 19 and the operating conditions of the lamps are controlled by the light or signal switches 31 and 32. A cam 34 is suitably mounted for rotation with the motor shaft 12, and the cam controls the opening and closing of the light switches in such a way that the signal light 29 is energized and illuminated when the shaft and antenna 10 are angularly positioned in a first 60° azimuthal sector, that both lamps 29 and 30 are energized when the rotating member (i.e., 10 and 12 collectively) is in a second 60° sector, and that only the lamp 30 is energized when the cam is in a third 60° sector. Therefore it will be seen that the invention, in a particularly simple manner, furnishes a remote indication as to which of a plurality of sectors is definitive of the approximate angular position of a rotating member, through a field of 180° in the particular embodiment shown.

Cam 34 is employed not only for the purpose of actuating the light or indicator switches, but also for the purpose of opening the counter-clockwise and clockwise limit switches 27 and 28, respectively.

Returning now to the signal light switch circuits, the two lights are essentially in parallel paths, the junction terminal 38 of which is connected to one side 6 of the power source secondary. The other terminals of the lamps are separately connected via the individual light switches 31 and 32 and line 39 to the other lead 40 of such secondary, lamp 29 being connected by line 41 to the fixed contact of light switch 31, and lamp 30 being connected by line 42 to the fixed contact on light switch 32. The cam-actuated or moving contacts of the light switches 31 and 32 are connected by lines 43 and 44, respectively, to line 39.

As illustrated in the single figure of the drawing, the shaft 12 is near its extreme counter-clockwise position and switch 27 is in closed position. Had the cam been at its extreme counter-clockwise position, cam 34 would have opened motor limit switch 27. In the position shown the 120° raised arcuate surface of the cam 34 holds light switch 31 closed, and lamp 29 is accordingly lighted to indicate that the antenna and motor shaft, or rotating member, are positioned in the first 60° sector. Assume now that the control switch is closed on contact 24, energizing winding 16 for a sufficient time to turn the shaft clockwise by 60°. In that event the rotating member stops at a position (60° clockwise from that illustrated) in which cam 34 holds both light switches 31 and 32 closed, and both lamps are illuminated to indicate that the motor shaft is in a second 60° sector located clockwise to the first. Assume now a further closing of contact 24 of control switch 25, for a time sufficient to turn the shaft clockwise by another 60°. The antenna and motor shaft attain a position whereat cam 34 permits light switch 31 to open but maintains the closure of light switch 32 so that lamp 30 only is energized to indicate a remote point that the motor shaft is in its third 60° sector. If control switch 25 is again closed on contact 24, cam 34 will move further clockwise and open limit switch 28, terminating the clockwise rotation of the shaft. The reverse sequence of events will occur when the control switch 25 is closed on contact 23, by energization of counter-clockwise winding 17, via closed switch 27. It will be understood that the motor shaft is rotated only during the time that switch 25 is actually closed on one of contacts 23 and 24. Upon the limit of the desired counter-clockwise rotation of the shaft, limit switch 27 is opened by cam 34. It will be observed that in the embodiment shown, the two motor limit switches confine the rotation to approximately 182°, the limit switches being positioned apart by 58° of arc and so arranged that at the two extremes of rotation both lights are extinguished slightly before the motor circuit is interrupted by the limit switches. Thus it will be seen that the invention provides two pilot lights 29 and 30, or indicators, at the remote point, together with circuitry that causes the first light 29 to be energized for the first sector of angular position of the rotating member, both lights 29 and 30 to be energized for the second sector, and the second light 30 to be energized for the third sector. It is within the teachings and disclosure of the present invention to make such modifications as an increment in the number of signaling means, or the provision of a total sweep of 360° as distinguished from the 182° of rotation to which the specific embodiment is confined. Conversely, the provision of a smaller sweep is within the scope of the invention.

In accordance with the invention, therefore, there is provided means for indicating the approximate position of a rotating member, comprising, in combination, a rotating member (10, 12), reversible prime mover means (15, 19, 25) for controlling the angular position of the rotatable member, means (27 and 28) for defining the limits of such rotation, means (34) positioned in synchronism with the rotatable member and having an angular operating characteristic (i.e., 120° cam surface) for actuating the limit-defining means (27 and 28) at the angular positions corresponding to such limits, a plurality of remote indicators (29 and 30) and a plurality of means (31, 32) for controlling such indicators, the last-mentioned means being actuated by said actuating means (34), and the angular characteristic of the actuating means (i.e., 120°) being a multiple (i.e., two) of the angular displacement between the indicator control means (i.e., 60°).

While there has been shown and described what is at present considered to be the preferred embodiment of the invention, it will be understood by those skilled in the art that various modifications and changes and substitutions of equivalents may be made therein within the true scope of the invention as defined by the appended claim.

What is claimed is:

Apparatus for indicating the approximate position of a rotating member, comprising, in combination, a rotating shaft member, reversible prime mover means for continuously angularly positioning the rotatable member, said prime mover means comprising a motor having a first winding adapted to be energized to drive the shaft member in one direction and a second winding adapted to be energized to drive the shaft member in the opposite direction, means comprising normally closed limit switches fixed in position and severally in circuit with said windings and adapted to be cam-actuated to de-energize the windings and to define the limits of such rotation, cam means positioned in synchronism with the shaft member and having a 120 degree raised surface with shoulders on each side for opening said switches at the angular positions corresponding to such limits, the included angle between said switches being approximately 60 degrees, a plurality of remote indicator lights and a plurality of normally open switches adapted to be closed to energize such indicator lights, the last-mentioned switches being actuated by the raised surface of said cam means, said normally open switches being displaced from each other by 60 degrees, and each from the nearest limit switch by 120 degrees, a power supply and a single-pole, double-throw switch for encircuiting either of said windings with said power supply and simultaneously setting up energizing circuits to said lights.

References Cited in the file of this patent
UNITED STATES PATENTS

| | | |
|---|---|---|
| 2,559,339 | Blease et al. | July 3, 1951 |
| 2,562,637 | Park et al. | July 31, 1951 |
| 2,711,527 | Barrett | June 21, 1955 |
| 2,736,854 | Will | Feb. 28, 1956 |
| 2,815,501 | Benson et al. | Dec. 3, 1957 |

UNITED STATES PATENT OFFICE
CERTIFICATE OF CORRECTION

Patent No. 2,911,636                                November 3, 1959

Harold Leroy Brouse

It is hereby certified that error appears in the printed specification of the above numbered patent requiring correction and that the said Letters Patent should read as corrected below.

Column 3, line 1, before "a remote point" insert -- at --.

Signed and sealed this 26th day of April 1960.

(SEAL)
Attest:

KARL H. AXLINE
Attesting Officer

ROBERT C. WATSON
Commissioner of Patents